UNITED STATES PATENT OFFICE.

KARL LUDWIG VALENTIN ZIMMER, OF HAMBURG, GERMANY.

DISINFECTANT.

1,010,210.  Specification of Letters Patent.  Patented Nov. 28, 1911.

No Drawing.  Application filed June 18, 1910.  Serial No. 567,693.

*To all whom it may concern:*

Be it known that I, KARL LUDWIG VALENTIN ZIMMER, manufacturer, a subject of the German Emperor, residing at Hamburg, Germany, have invented certain new and useful Improvements in the Manufacture of Disinfectants, of which the following is a specification.

Formaldehyde has long been used as a powerful disinfectant. Hitherto, however, it has not been considered possible, to prepare mineral-oils, tar-oils and resin-oils containing considerable quantities of formaldehyde in such a manner, that they retain the formaldehyde and consequently their disinfecting properties unaltered for a long time.

The present invention has for its object, to overcome this difficulty.

According to the present process castor oil or other suitable vegetable oils are converted into sulfo-acids by means of sulfuric acid in a known manner, the latter is separated from the free sulfuric acid, neutralized almost completely with alkali and concentrated. On the other hand a caseinate solution is prepared, preferably by separating the casein from skimmed milk by means of rennet, washing and pressing and then dissolving it in borax solution. The caseinate solution is mixed with the almost neutralized and concentrated sulfoleate solution, after which formaldehyde is introduced, preferably in the shape of a gas, until saturation. For example, 1000 kilos of castor oil are saponified with 300 kilos of English sulfuric acid in a known manner, the sulfo-acid obtained is separated from the residue of free sulfuric acid, then almost neutralized by means of caustic soda solution of 38° Bé., and finally concentrated by heating. 1000 kilos of the sulfoleate thus obtained are mixed with 500 kilos of caseinate solution obtained by separating the casein from skimmed milk by means of rennet, drying the casein, and dissolving 100 parts of dried casein in a solution of 100 parts of borax in 250 parts of water. Into the solution of sulfoleate in the casein solution gaseous formaldehyde is then introduced until saturation. The product thus obtained, in which the formaldehyde will remain unaltered for an almost unlimited time, is suitable as a disinfectant in many cases. Its most important use, however, is as an efficient emulsifying medium for mineral oils, tar-oils, various kinds of tar and resin oils, that is to say, for the manufacture of various kinds of oil-emulsions, which possess strong disinfecting properties and retain these properties unaltered for a long time. For preparing these water-soluble emulsions a quantity of the above described mixture of sulfo-acid and casein-preparation containing formaldehyde, equal in weight to about 3 to 5 per cent. of the oil to be emulsified, is introduced into a suitable receptacle provided with an agitator, after which the oil is caused to flow in gradually, while constantly stirring. In this manner a homogeneous product is obtained, which dissolves or emulsifies with water in any proportion and has powerful permanent disinfecting properties, inasmuch as volatilization or decomposition of the formaldehyde contained in the emulsion does not take place.

The principal advantage of the process lies in the fact, that the products obtained by the same retain their strong disinfecting properties undiminished even after a very long time.

The emulsions or preparations thus obtained have a reliable effect, even when highly diluted, they penetrate the objects to be sterilized and are not obnoxious to the neighborhood by smell or other unpleasant properties. They are specially suitable for sterilizing large surfaces, such as roads, open spaces, halls, schools, churches and other public resorts, and may be used generally for disinfection, also for washing and other purposes.

What I claim is:—

1. The process for the manufacture of a permanent disinfectant containing formaldehyde and capable of readily emulsifying mineral oils, tar, tar oils and resin oils, which comprises mixing sulfo acid obtained from vegetable oil by means of sulfuric acid, with a caseinate solution and introducing formaldehyde into the mixture thus obtained, substantially as described.

2. The process for the manufacture of a permanent disinfectant containing formaldehyde and capable of readily emulsifying mineral oils, tar, tar oils and resin oils, which comprises preparing sulfo acid from vegetable oil by means of sulfuric acid, nearly neutralizing the same, mixing the product with a caseinate solution and introducing formaldehyde into the mixture, substantially as described.

3. The process for the manufacture of an easily emulsifiable oily disinfectant from mineral oils, tar, tar oil, resin oil, and similar oils which consists in mixing caseinate-solution with a sulfo-acid obtained from vegetable oils by means of sulfuric acid and partly neutralized, introducing formaldehyde into the mixture, then gradually introducing said raw material into the said product and thoroughly mixing it with the latter, substantially as described.

In testimony whereof I have hereunto set my hand in presence of two subscribing witnesses.

KARL LUDWIG VALENTIN ZIMMER.

Witnesses:
 MOSE MILLER,
 MAX HESSE.